(12) United States Patent
Spindler et al.

(10) Patent No.: US 12,145,332 B2
(45) Date of Patent: Nov. 19, 2024

(54) VEHICLE TIRE INFLATION COMPRESSOR FOR POWERED DATA PORTS

(71) Applicant: ILLINOIS TOOL WORKS INC., Glenview, IL (US)

(72) Inventors: Martin Patrick Spindler, Aach-Linz (DE); William Craig Keller, Medway, MA (US)

(73) Assignee: Illinois Tool Works Inc., Glenview, IL (US)

( * ) Notice: Subject to any disclaimer, the term of this patent is extended or adjusted under 35 U.S.C. 154(b) by 195 days.

(21) Appl. No.: 17/752,288

(22) Filed: May 24, 2022

(65) Prior Publication Data
US 2022/0332066 A1    Oct. 20, 2022

Related U.S. Application Data

(63) Continuation-in-part of application No. 17/107,162, filed on Nov. 30, 2020, now abandoned, which is a
(Continued)

(51) Int. Cl.
*B29C 73/16*  (2006.01)
*B60S 5/04*   (2006.01)
*B60C 25/00*  (2006.01)

(52) U.S. Cl.
CPC ............ *B29C 73/166* (2013.01); *B60C 25/16* (2013.01); *B60S 5/04* (2013.01); *B60S 5/046* (2013.01)

(58) Field of Classification Search
CPC .......... B60S 5/046; B60S 5/04; B29C 73/025; B29C 73/166; B60C 25/16;
(Continued)

(56) References Cited

U.S. PATENT DOCUMENTS 5,126,642 A * 6/1992 Shahrodi ................. H02P 27/08
                                                  318/268
5,611,875 A * 3/1997 Bachhuber ........ B60C 23/00372
                                                   141/95
(Continued)

FOREIGN PATENT DOCUMENTS

CN         1991932 A    7/2007
CN     203 819 164 U    9/2014
(Continued)

OTHER PUBLICATIONS

CN-204239179-U English Translation of Specification (Year: 2021).*
(Continued)

*Primary Examiner* — David Colon-Morales
*Assistant Examiner* — Stephanie A Shrieves
(74) *Attorney, Agent, or Firm* — McAndrews, Held & Malloy, Ltd.

(57) ABSTRACT

A device and method for dispensing air and/or sealant to a tire of a vehicle. Power supply for the air compressor is obtained via powered USB instead of the typical 12 V cigarette lighter connector. The position of the tire which is being inflated can also be determined via the data interface of the USB port. By communication between a compressor control module and the vehicle systems interface, the compressor can automatically switch off when the recommended tire pressure has been reached. The control module can be located in the USB power cord plug, and can provide for changes in voltage to the compressor to maximize power and inflation rate and/or efficiency.

20 Claims, 6 Drawing Sheets

Related U.S. Application Data continuation-in-part of application No. 16/432,313, filed on Jun. 5, 2019, now Pat. No. 10,933,844.

(60) Provisional application No. 62/688,204, filed on Jun. 21, 2018.

(58) Field of Classification Search
CPC .............. B60C 23/00363; B60C 23/00; B60C 23/0484; B29D 30/00; B29L 2030/00; G05D 16/2066
USPC ............................................ 141/38; 152/415
See application file for complete search history.

(56) References Cited

U.S. PATENT DOCUMENTS

| | | | |
|---|---|---|---|
| 6,633,932 B1 | 10/2003 | Bork et al. | |
| 6,705,360 B1* | 3/2004 | Bonzer | B60S 5/046 417/313 |
| 6,854,984 B1 | 2/2005 | Lee et al. | |
| 6,997,347 B2* | 2/2006 | Peng | G01N 33/0006 222/3 |
| 7,445,533 B2* | 11/2008 | Norton | F04B 41/02 141/38 |
| 7,706,930 B2 | 4/2010 | Corniot | |
| 7,789,112 B1* | 9/2010 | Wise | B60S 5/046 141/38 |
| 7,926,521 B2* | 4/2011 | Izumoto | B60S 5/046 141/105 |
| 9,789,739 B1 | 10/2017 | Hennig | |
| 9,914,271 B2 | 3/2018 | Spindler et al. | |
| 2002/0130771 A1 | 9/2002 | Osborne et al. | |
| 2002/0187056 A1* | 12/2002 | Gonzaga | B60S 5/046 417/302 |
| 2003/0040843 A1* | 2/2003 | Forti | B60C 23/0408 700/279 |
| 2004/0042735 A1 | 3/2004 | Ma | |
| 2005/0265873 A1 | 12/2005 | Chou | |
| 2008/0277044 A1* | 11/2008 | Marini | F04B 35/06 417/313 |
| 2009/0218005 A1 | 9/2009 | Stehle | |
| 2010/0189575 A1 | 7/2010 | Yoshida et al. | |
| 2010/0305809 A1* | 12/2010 | Audisio | B60C 23/0433 701/31.4 |
| 2012/0224978 A1* | 9/2012 | Ferber | B60C 23/0484 701/1 |
| 2012/0232753 A1* | 9/2012 | Lhuillier | B60C 23/0479 701/36 |
| 2012/0283984 A1 | 11/2012 | Peng | |
| 2013/0145834 A1 | 6/2013 | Mouchet | |
| 2015/0059918 A1 | 3/2015 | Schondorf et al. | |
| 2015/0326039 A1* | 11/2015 | Chen | H02J 7/00 323/318 |
| 2019/0263363 A1 | 8/2019 | McIntyre et al. | |
| 2019/0322247 A1 | 10/2019 | Hibbard | |
| 2019/0389435 A1 | 12/2019 | Spindler et al. | |
| 2021/0078546 A1 | 3/2021 | Spindler et al. | |

FOREIGN PATENT DOCUMENTS

| | | | |
|---|---|---|---|
| CN | 104276152 A | | 1/2015 |
| CN | 204239179 U | * | 4/2015 |
| CN | 204558844 U | | 8/2015 |
| CN | 204 633 382 U | | 9/2015 |
| CN | 109390824 A | | 2/2019 |
| DE | 10 2016 122 735 A1 | | 5/2018 |
| DE | 102020214023 A1 | | 5/2022 |
| WO | 2009067855 A1 | | 6/2009 |
| WO | WO 2022/268661 A1 | | 12/2022 |

OTHER PUBLICATIONS

U.S. Patent Office, English language version of the International Search Report, Form PCT/ISA/210 for International Application PCT/US2019/037886, Aug. 13, 2019 (4 pages).

U.S. Patent Office, English language version of the Written Opinion of the International Searching Authority, Form PCT/ISA/237 for International Application PCT/US2019/037886, Aug. 13, 2019 (8 pages).

EPO, HV Rijswijk, NL, English language version of the International Search Report, Form PCT/ISA/210 for Int'l Appln. PCT/US2021/061161, Feb. 25, 2022 (4 pages).

EPO, HV Rijswijk, NL, English language version of the Written Opinion of the International Searching Authority, Form PCT/ISA/237 for Int'l Appln PCT/US2021/061161, Feb. 25, 2022 (8 pages).

PCT, International Search Report and Written Opinion regarding PCT Application No. PCT/US2023/021848, dated Sep. 20, 2023, 14 pages.

* cited by examiner

|  | Amperage | | | | |
| --- | --- | --- | --- | --- | --- |
| Volt | 1 | 2 | 3 | 4 | 5 |
| 48 | 48 | 96 | 144 | 192 | 240 |
| 36 | 36 | 72 | 108 | 144 | 180 |
| 28 | 28 | 56 | 84 | 112 | 140 |
| 20 | 20 | 40 | 60 | 80 | 100 |
| 15 | 15 | 30 | 45 | 60 | 75 |
| 9 | 9 | 18 | 27 | 36 | 45 |
| 5 | 5 | 10 | 15 | 20 | 25 |

VEHICLE TIRE INFLATION COMPRESSOR FOR POWERED DATA PORTS

CROSS REFERENCE TO RELATED APPLICATION

This application is a continuation-in-part of U.S. patent application Ser. No. 17/107,162, filed on 30 Nov. 2020, which is a continuation-in-part of U.S. patent application Ser. No. 16/432,313, filed on 5 Jun. 2019, now U.S. Pat. No. 10,933,844, which claims the benefit of U.S. Provisional Application Ser. No. 62/688,204, filed on 21 Jun. 2018. This parent application is hereby incorporated by reference herein in its entirety and are made a part hereof, including but not limited to those portions which specifically appear hereinafter.

BACKGROUND OF THE INVENTION

Field of the Invention

This invention relates to a device for dispensing air and/or tire sealant by a pressure source, and more particularly a portable vehicle tire inflation device that can be powered via vehicle data ports.

Description of Prior Art

There are many different forms and designs of vehicle tire inflators known and currently available on the market. They are primarily used for introducing air and/or tire sealant into low pressure tires or damaged tires. Portable tire inflators are powered by the common 12 V direct current (DC) connectors, such as the ubiquitous cigarette lighter plug (e.g., as defined in ANSI/SAE J563) for the vehicle cigarette lighter receptacle or socket.

As vehicle technology and electronics improve, there is a continuing need or opportunity for improved vehicle accessories that interconnect with these new vehicle systems.

SUMMARY OF THE INVENTION

Embodiments are directed to a device for dispensing air and/or sealant, such as a mini-compressor or inflator, with a pressure source powered and/or controlled through a data communication port and cord, such as a powered Universal Serial Bus (USB) and USB cord, instead of the usual 12 V connector (cigarette lighter). While suitable for various inflation needs, the device is particularly useful for portable or emergency vehicle dispensing/inflator devices, and is powered and/or controlled via the vehicle's data communication port (e.g., USB).

In embodiments, during inflation or dispensing, the status of the object inflated, e.g., the vehicle tire, can be monitored and/or determined via the data interface of the vehicle USB port. By communication between compressor and the vehicle electronics systems (e.g., RDC or ECU), the compressor can switch off when the recommended tire pressure has been reached.

In some embodiments, additional comfort functions can be realized, such as by help of the vehicle entertainment system. For example, the remaining filling time can be calculated and displayed on a screen of the inflator and/or via a vehicles user interface display. Or, depending on the course of the filling procedure, collective system can predict whether the tire can be repaired by help of the compressor. In case of need, help by a third party can be ordered without delay.

These and other benefits can be obtained by a device for dispensing air and/or sealant to a tire of a vehicle, which includes a pressure source, a dispenser outlet connected to the pressure source, a connector element, and a control module in communication with each of the connector element and the pressure source. The connector element, e.g., a data and/or power cord, is desirably configured to connect to a vehicle data communication port (e.g., USB or equivalent) to obtain inflation information and/or power. The data communication element desirably is a powered data communication port, whereby the control module can draw operational power for the dispensing device via the powered data communication port.

In embodiments the control module obtains tire inflation values from a vehicle tire pressure monitoring system and/or other sensor systems, such as vehicle load sensors. The device can automatically operate (e.g., turn on) upon receiving a low tire inflation value from the vehicle tire pressure monitoring system (TPMS), and automatically cease inflation upon automatically determining a proper inflation.

In some embodiments the control system for the compressor operates in combination with the human-machine interface (HMI) system of the vehicle. The vehicle HMI can display an inflation status, display pictorial instructions, and/or allow control through the display, such as switching on/off the compressor or setting desired pressure values.

In embodiments the device for dispensing air and/or sealant to a tire of a vehicle including a powered data communication port, includes a pressure source integrated with the device; and a control module configured to connect to the powered data communication port to power and control the pressure source. The control module can be in the device housing or in a connector element for the vehicle port, and can includes a logic circuit configured to receive information about pressure and temperature originating from vehicle tire pressure sensors and/or an electronic system of the vehicle.

The device generally includes a power supply cord having a plug that fits into the data communication port. In embodiments, the control module is contained within the plug (USB), and configured to provide and stop power from powered data communication port through the power supply cord to the pressure source.

Embodiments further include a device for dispensing air and/or sealant to a tire of a vehicle, the vehicle including a powered data communication port. The device includes a pressure source, a dispenser outlet connected to the pressure source, and a power supply cord including a first end that is connected or connectable to the pressure source and a second end opposite the first end, the second end including a connector element configured to connect to the powered data communication port to obtain power. The connector element includes a control module configured to control a power supply to the pressure source through the power supply cord. Power and inflation data can be transferred from the data communication port to the control module via the connector element. Preferably, the control module is fully housed within the connector element, and contains all control logic configured to communicate with a computer system on the vehicle and to provide operational power to the device for dispensing air and/or sealant to the tire of the vehicle. In such embodiments, the power supply cord can be a two-wire power cable, without data communication cables.

Embodiments include a tire inflation power/control system, such as including a control module circuit/intelligence in a USB plug, that controls power consumption of the compressor and/or from the power consumption determines pressure information of the tire. Desirably this control system is intelligent, in that it can adjust the amperage and/or the voltage, which can optimize usage and shorten the time for filling. In particular embodiments, the control system determines/estimates backpressure from the power consumption of the inflator compressor, and can thus determine a tire pressure. This information together with the connection to the vehicle TPMS allows the control system to calculate/predict the remaining fill time and/or stop the system upon reaching a placard pressure. In addition, the voltage can be switched/adjusted to stay within an optimum working range of the compressor motor over the pressure range. Embodiments include defining points where the supply voltage is changed based on the motor efficiency curves for the different voltages.

Embodiments include a device for dispensing air and/or sealant to a tire of a vehicle with a powered data communication port, the device including a compressor and a control module configured to connect to the powered data communication port to power the compressor. The control module is configured to change a voltage output from the powered data communication port to the compressor during operation, and/or estimate a remaining fill time for the tire. The control module incudes a logic circuit, preferably in the plug head of the power cable, configured to receive information about pressure originating from vehicle tire pressure sensors and/or an electronic system of the vehicle.

In embodiments, the control module is configured to operate the compressor at a first voltage and then switch to a second, different voltage during operation. The voltage switch can be up or down, depending on need, and can be to a lower voltage when the compressor draw is at or near a predetermined amperage draw (e.g., at a maximum). In embodiments of this invention, the compressor operates at a higher first power output and inflation rate at the first voltage, and a lower power output and inflation rate at the second voltage. This allows for a faster inflation rate when the tire backpressure is lower. The switch from the first voltage to the second voltage is desirably preset according to a compressor motor design and efficiency.

In embodiments, the device for dispensing air and/or sealant to a tire of a vehicle includes a power supply cord including a first end that is connected or connectable to the dispenser and a second end opposite the first end, the second end including a connector element configured to connect to a vehicle powered data communication port to obtain power. The connector element includes a control module configured to control a power supply to the pressure source through the power supply cord. The control module includes a logic circuit configured to receive information about tire pressure originating from vehicle tire pressure sensors and/or an electronic system of the vehicle. The control module adjusts a voltage to the compressor according to a tire pressure and/or an amperage draw of the compressor. Desirably, the control module adjusts a voltage to the compressor within an efficiency range of a compressor motor as a function of a determined tire pressure. For example, the control module can be configured to operate the compressor at a first voltage to provide a higher power output and/or inflation rate, and then switch to a second voltage during operation, wherein the second voltage provides a lower power and/or inflation rate within a predetermined compressor motor efficiency curve.

Embodiments further include a method for dispensing air and/or sealant to a tire of a vehicle. The method includes connecting a tire inflation or repair device to the tire, connecting the tire repair device to a data communication port of the vehicle, and powering the tire repair device dispensing via the data communication port of the vehicle. The method can further include automatically monitoring and/or controlling a tire inflation via data provided to the tire repair device by the vehicle via the data communication port.

Embodiments further include a method for dispensing air and/or sealant including: connecting a tire repair device to the tire, connecting a connector element of a power supply cord of the tire repair device to a data communication port of the vehicle, the connector element including a control module, and the control module in the connector element operating the tire repair device dispensing via the data communication port of the vehicle.

Embodiments further include a method for dispensing air and/or sealant to a tire of a vehicle, wherein a compressor is connected to the tire, and a connector element is connected to a data communication port of the vehicle. The method includes a control module in the connector element operating the tire repair device dispensing via the data communication port of the vehicle; the control module operating the compressor at a first voltage; and the control module operating the compressor at a second voltage that is different from the first voltage. In some embodiments, the operating the compressor at the first voltage provides an initial inflation power, and the control module lowers to the second voltage upon reaching a predetermined maximum amperage draw for the compressor.

BRIEF DESCRIPTION OF THE DRAWINGS

The above-mentioned and other features and objects of this invention will be better understood from the following detailed description taken in conjunction with the drawings.

DESCRIPTION OF PREFERRED
EMBODIMENTS

Figure 1:
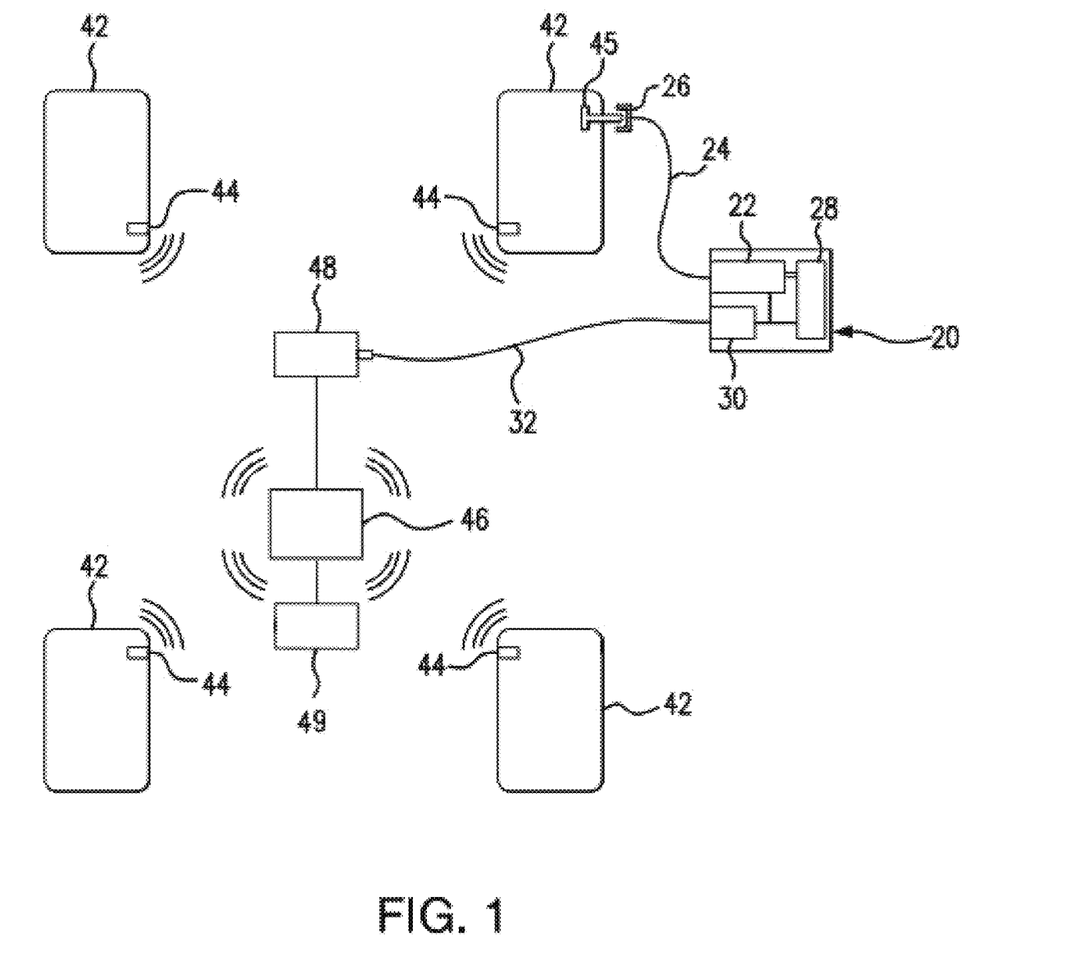
FIG. 1 is a representative illustration of a dispensing device according to embodiments of this invention in combination with a vehicle.

FIG. 1 illustrates a device 20 according to embodiments for dispensing air and/or tire sealant into tires 42 of vehicle 40. The vehicle 40 is representatively show as including four tires 42, each including a tire pressure monitoring system (TPMS) sensor 44. As currently known and implemented throughout the automotive industry, the TPMS sensors 44 communicate by any suitable connection, such as wirelessly, with the vehicle control computer system 46, such as the electronic control unit (ECU) or equivalent system or subsystem. The vehicle 40 further includes a data communications port 48, such as a powered USB port in combination with the computer system 46, and an interface display 49, such as a touchscreen.

Device 20 includes a pressure source 22 that can be connected to the tire 44 by a dispenser outlet, shown as air hose 24 with any suitable end valve 26 to match the tire stem 45, such as a Schrader valve. The pressure source 22 is desirably embodied in the form of a compressor, and can optionally be paired with a sealant canister 28 for dispensing both air and tire sealant.

The device 20 further includes a module 30 configured to connect to the data communication port 48 of the vehicle 40 to power and/or control the pressure source 22. The module 30 connects via connector element 32 to obtain inflation information and/or power, such as a power and/or data cord. The connector element 32 has an end integrally connected (i.e., fixed) to the module 30, or can be a separate cord having a plug that fits into a corresponding socket in the device 20. Any suitable data and/or power connection can be used, depending on need and the vehicle components. Powered USB cords and sockets are preferred due to current inclusion within vehicle audio or other systems. Any suitable USB version and/or connector type, such as standard, mini, or micro Type A, B, or C, etc., can be used. As will be appreciated, other suitable data and/or power connectors such as Thunderbolt™ or Lightning™ cables, or combinations of any of the interfaces, can be used depending on need.

Embodiments use a powered USB or equivalent connection instead of the traditional and common 12V-DC-connectors, for supplying compressors with power. Additionally or alternatively (i.e., along with the traditional 12 V connector), data can be exchanged between the vehicle and dispensing device. In some embodiments, the control module includes an integrated logical circuit, for example, to receive information about pressure and temperature originating from the tire pressure sensors and/or ECU. This information can be used as control parameters, such as to automatically control the device and the inflation process. The control algorithm(s) can optionally be executed on the vehicle systems, with the device receiving simple operational instructions (e.g., on/off).

In some embodiments the communication between the vehicle's systems and the compressor device would render obsolete manual displays of pressure by a manometer on the compressor. The complete control of the compressor can be realized by the vehicle and compressor electronics. Manual on/off-switches could also be omitted, as the device automatically starts inflation as needed when connected and ceases inflation upon automatically determining a proper inflation. The ability to reduce pressure may also be omitted, because the compressor cannot overfill the tire due to the communication with the vehicle. In some embodiments, the compressor control is through the vehicle interface display 49, such as turning the compressor on/off and/or setting desired pressure for inflation.

Figure 2:
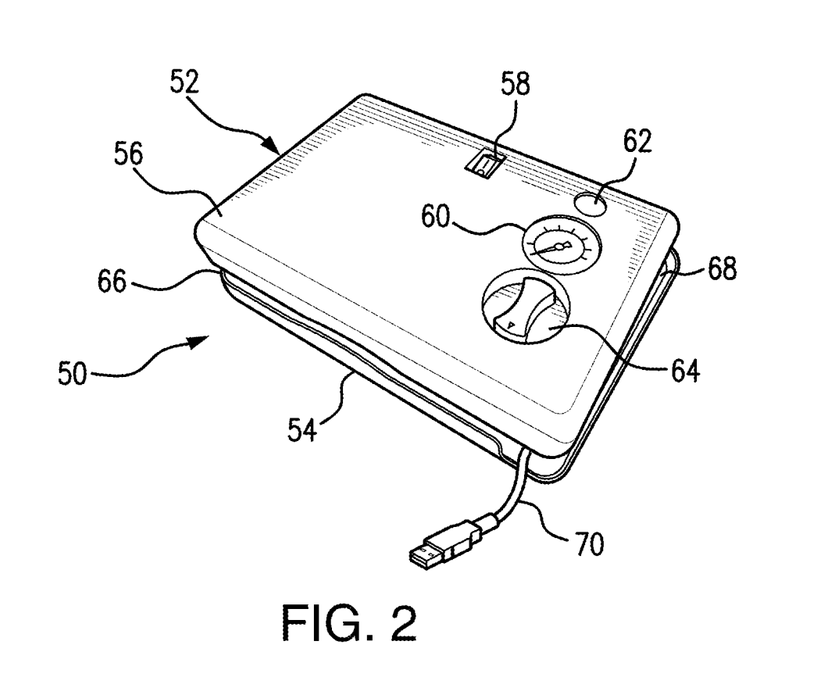
FIG. 2 illustrates a dispensing device according to one embodiment of this invention.

FIG. 2 shows a device 50 for dispensing air and/or tire sealant according to one embodiment. The device 50 can have internal components such as described in U.S. Pat. No. 9,914,271, herein incorporated by reference. The device 50 includes a housing 52 formed of a bottom receptacle 54 and a cover 56. The device of FIG. 2 shows a dispensing device, with traditional functional elements such as a switch 58 for switching the device on and off, a manometer 60 for measuring the pressure built up by the internal pressure source, a pressure release button 62 for releasing excess pressure, and a rotary switch 64 for actuating a valve for an optional sealant canister. Between the receptacle 54 and the cover 56, a circumferential slot 66 is provided into which a USB or equivalent cable 70 for powering or operating the device and/or a hose 68 for dispensing air and/or tire sealant can be wrapped and stored.

Figure 3:
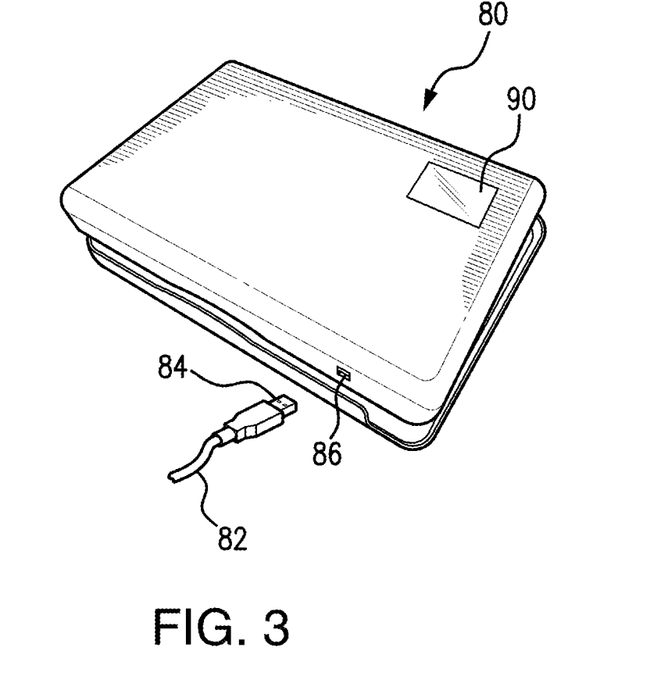
FIG. 3 illustrates a dispensing device according to another embodiment of this invention.

In FIG. 2, the USB cable 70 is fixed or integrated at one end to the device 50, similar to most current 12 V compressor power cords. FIG. 3 illustrates a further embodiment wherein the dispensing device 80 has a separate USB cord 82 that has a USB plug 84 that is removably attachable to a corresponding USB socket or receptacle 86 on the device 80 as the power supply port. The socket 86 is shown in a side wall of the housing, but can be placed anywhere on the device, such as the top surface, depending on need or other design considerations.

FIG. 3 also illustrates a device without the functional elements for the user operation shown in FIG. 2. The device of FIG. 3 operates automatically with the vehicle system(s) to turn the compressor and/or sealant on and off. The device 80 is shown only with an optional display screen 90, which can display information such as, without limitation, a pressure value, a remaining inflation time, warning messages, sealant amount, and/or other information.

In some embodiments the power control logic is integrated with the connector element, such as within the connecter plug of the power supply cord that fits into the powered data communication port of the vehicle. In this manner, the compressor device itself can be a 'dumb' device that does not require any logic or other smart control features. The control module in the power supply cord acts as the switch to activate/deactivate the pressure source (e.g., compressor) via introducing/stopping power from the powered data communication port of the vehicle.

Figure 4:
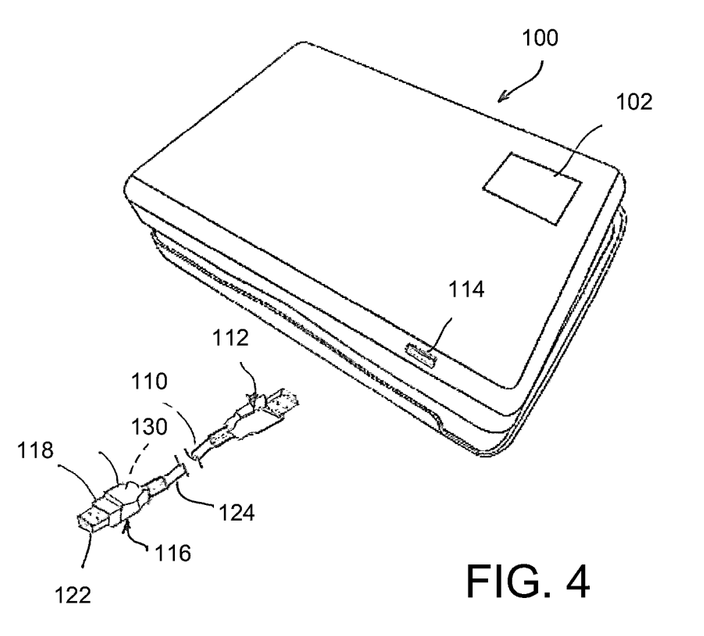
FIG. 4 illustrates a dispensing device according to another embodiment of this invention.

FIG. 4 illustrates a dispensing device 100, also without the functional elements for the user operation shown in FIG. 2. The device of FIG. 4 operates automatically with the vehicle system(s) to turn the compressor and/or sealant on and off. The device 100 is shown only with an optional display screen 102, which can display information such as, without limitation, a pressure value, a remaining inflation time, warning messages, sealant amount, and/or other information. The device 100 includes a power supply cord 110, with a first end 112 having a USB or equivalent plug corresponding to USB port 114 on the device 100. Alternatively, the first end 112 can be integral or 'hard-wired' to the electro-mechanical components of the device 100, namely the pressure source, any powered valves/switches, and/or the optional display screen components/controls.

The power supply cord 110 includes a second end 116 with a connector or plug 118 that connects to a powered data communication port of the vehicle. As shown, the plug 118 is also a USB connector for a USB port. The plug 118 includes, at least partially and preferable all of, the control module for starting and stopping the electric operational power to the device 100. As shown, the plug 118 includes an optional larger plug housing 120 to accommodate the control module 130. The control module is disposed between a USB connector 122 extending from the housing 120, and the power cable 124 extending to the device 100. With all the power control logic on/in the plug, the cable 124 can be a standard two-wire cable and the compressor device 100 can be a standard compressor of the applicable performance class (limited to the performance of the USB-PD power supply). This has additional benefit of reducing the overall cost for the device, and not needing a shielded data/communication channel in the cable to the device. The cable that powers the compressor device is a standard cable, but the plug on the cable going into the USB socket in the vehicle carries all the control logic for TPMS communication and power management, such as described above.

The automated dispensing devices of embodiments of this invention can include any necessary circuitry, data processors, memory components, encoded software instructions, and/or control algorithms to obtain vehicle and tire inflation data and values through the vehicle data communication port. The vehicle system(s) can additionally include necessary coordinating software, logic circuits, etc. to send information obtained from, or control instructions based upon, the TPMS and/or load sensors to the inflator for operation. In some embodiments the dispensing device can determine that a puncture needs sealing based upon a detected rate of inflation, or lack of expected inflation, and automatically dispense sealant.

Embodiments include a control system and methods that allow for control of power consumption of the compressor and/or determination of the compressor and/or tire air pressure from the power consumption. The control system and methods of some embodiments preferably perform intelligent functions, such as adjusting the voltage and/or amperage, which can optimize usage and shorten the time for filling (in contrast, current tire inflation devices typically have a fixed voltage of 12V with a maximum of 15 Amps).

Figure 5:
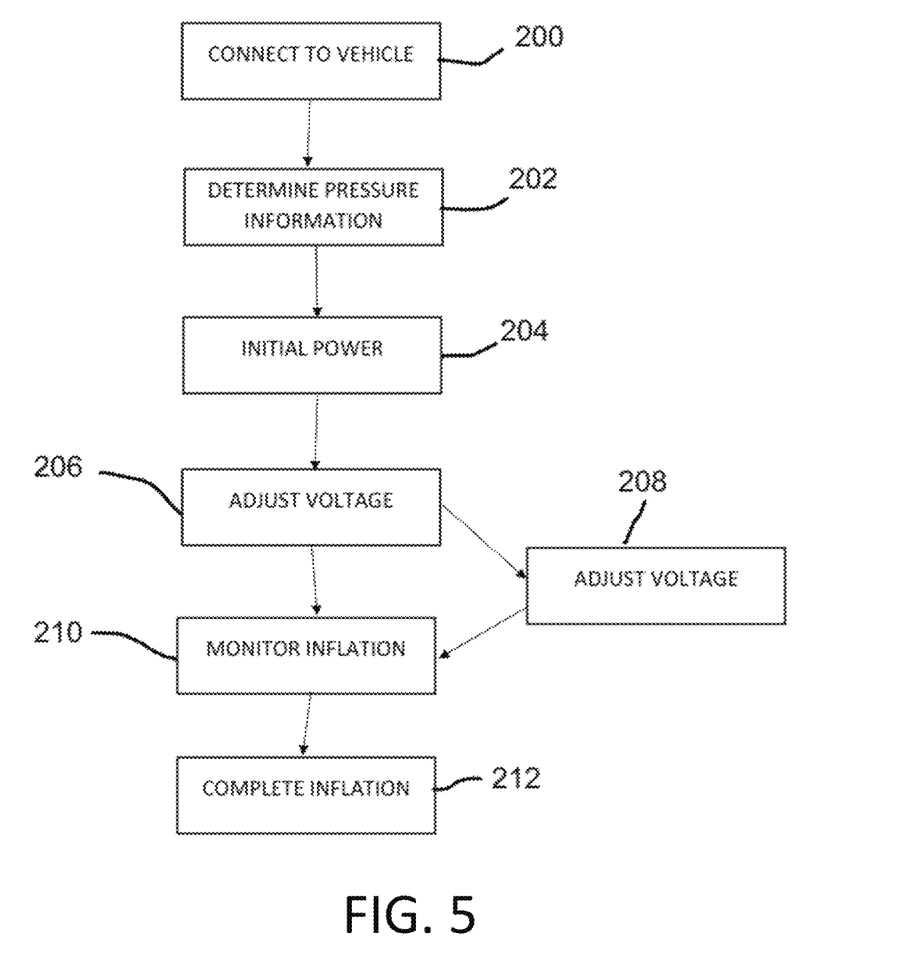
FIG. 5 is a flow diagram for a method of tire inflation according to one embodiment of this invention.

FIG. 5 is a flow diagram of a tire inflation process according to some embodiments. Step 200 represents the connection of a tire inflation and/or sealant device, such as described above. A dispenser outlet is connected to the valve stem of the tire, and a power cord is connected into a powered data communication port (e.g., USB) of the vehicle. The vehicle is running or started as needed, such that the vehicle systems (e.g., engine control unit (ECU), TPMS, etc.) are operational to power and communicate with the inflation system. For further discussion of FIG. 5, the control system is embodied as control circuitry within a USB plug for the powered data communication port.

In step 202, the USB plug control module determines inflation values, such as, without limitation, a current tire inflation value from the TPMS and/or a full or placard inflation value. The control system can optionally also determine secondary considerations, such as outside temperature and cargo/towing load, etc.

Figure 6:
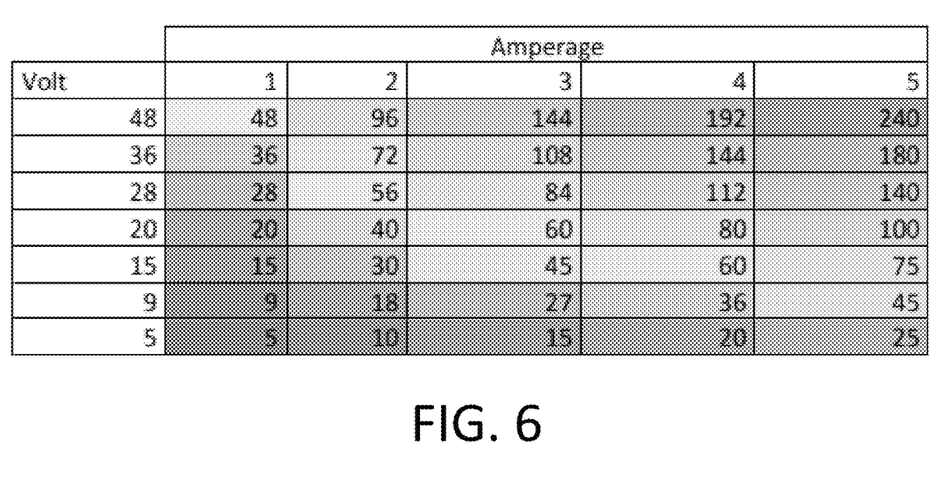
FIG. 6 shows an exemplary table of voltage values according to one embodiment of this invention.

In step 204, power is sent by the USB plug control module through the associated cable to the inflation device to power a compressor motor. In some embodiments the power supply to the compressor is intelligent/adaptive, and automatically adjusted by the control system. In step 206, the USB plug control module adjusts the voltage to the compressor motor, which in turn changes the power output of the compressor. FIG. 6 shows a table of the power output at example voltages/amperages for a compressor motor. As can be seen in this table, stepping up or down the voltage provides various power (Watt) amounts, at different amperages. For example, the USB-based power delivery system of some embodiments allows a variance of different voltage settings for a maximum 5 Amp current flow. In the example table of FIG. 6, the system can switch between 48, 36, 28, 20, 15, 9 and 5 Volts and regulate the power output at any output between 25 and 240 Watts. The particular voltage, amperage, and power values can vary, depending on need. The voltage can be adjusted up or down according to predetermined motor efficiency curves in step 206, and can be optionally adjusted additional times in step 208, depending on need. In the table of FIG. 6, the lighter shaded values represent a generally desired efficiency band for most tire inflation compressor operations.

In some embodiments, the voltage is kept as close as possible around the optimum working point of the motor over the pressure range. For example, the point(s) where the supply voltage is changed is/are pre-designed based on the motor efficiency curves for the different voltages.

In some embodiments, the compressor begins at a higher operation voltage in step 204, and then the voltage is reduced in step 206. For example, using a higher voltage at initial inflation start-up provides for an increased initial inflation rate. As the amperage approaches a maximum desired value and/or the compressor is reaching a maximum operation temperature, the voltage can be switched and reduced, to lower the power output, and generally the amperage and operating temperature as well. By starting at a higher voltage and inflation rate, the total tire inflation time can be reduced, and when the backpressure increases, the voltage is reduced to return to a more efficient operation and avoid surpassing the maximum amperage and/or operating temperatures.

The control system monitors the continued inflation in step 210 until the system determines that the desired inflation is obtained. The control module then powers off the compressor in step 212. In some embodiments the control system can calculate a backpressure from the power consumption. This information, along with the vehicle TPMS, allows the system to calculate/predict the remaining fill time and/or stop the system upon reaching the placard pressure. Each compressor has an air flow characteristic based on the working stage (Watts) and backpressure. This information can be used to determine/estimate the pressure increase rate of the tire, the tire air volume, and/or a remaining inflation time.

In some embodiments the compressor operates based on preprogrammed algorithms for the particular compressor and its efficiency curve. However, dependent of the level of communication allowed with the vehicle, the control system can take into consideration additional parameters such as, without limitation, the tire pressure being adjusted for vehicle load or outside conditions (temperature, precipitation, etc.), a placard pressure override to compensate the pressure losses in the time span between the compressor switch-off and when the vehicle starts moving, and/or temperature influence for sealant seal time).

The present invention is described in further detail in connection with the following examples, which illustrate or simulate various aspects involved in the practice of the invention. It is to be understood that all changes that come within the spirit of the invention are desired to be protected and thus the invention is not to be construed as limited by these examples.

EXAMPLES

Figure 7:
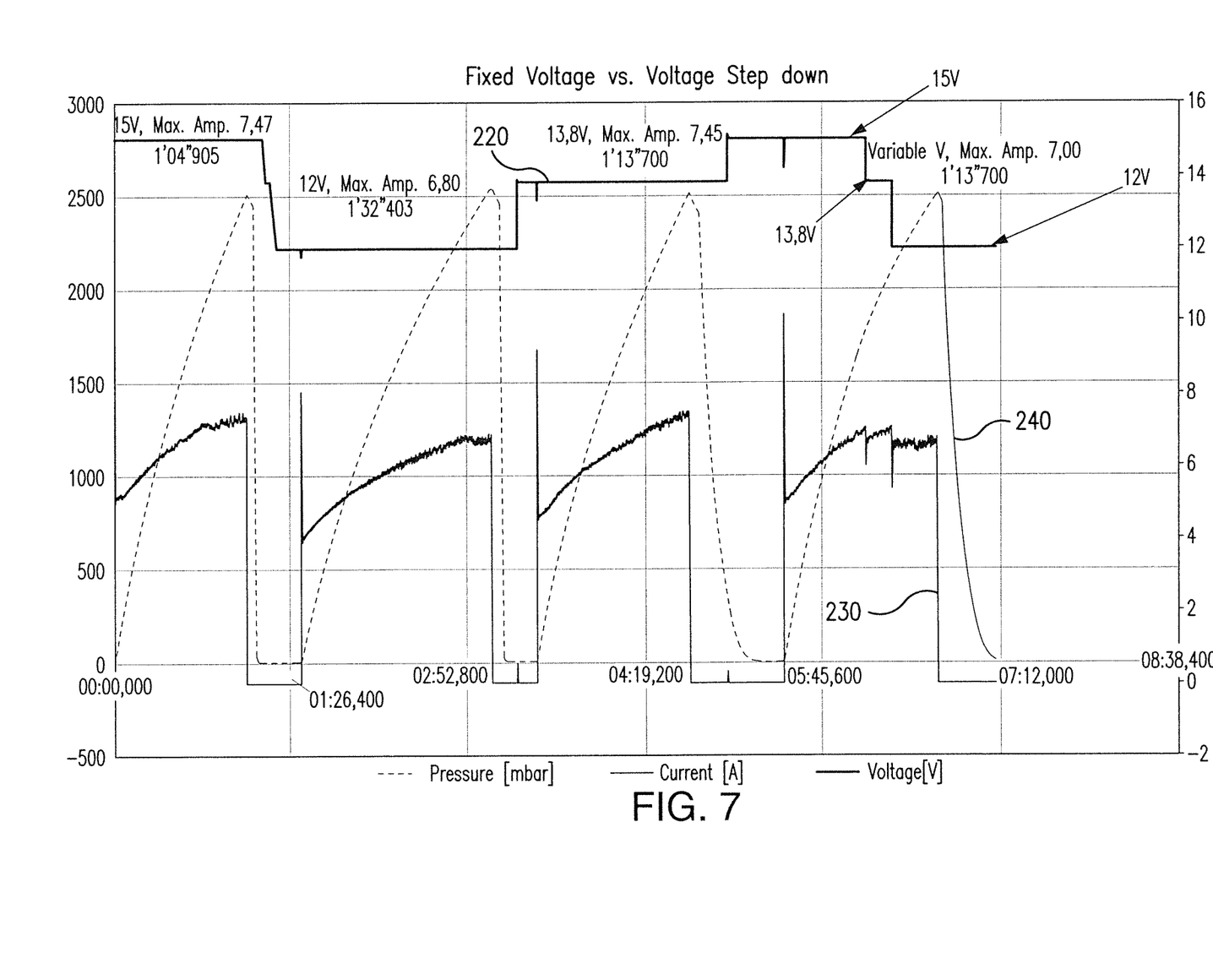
FIG. 7 is a graph comparing fixed inflation voltage to a stepped inflation voltage according to one embodiment of this invention.

FIG. 7 shows exemplary inflation curves for three fixed voltage inflators (15V, 12V, and 13.8V) compared to a variable-voltage inflator according to one embodiment. FIG. 7 shows the influence of the variable compressor control cycle (for 7 Amp maximum) versus the inflation times and current draws at fixed voltages. In general, the stepped voltage (line 220) achieved generally the same inflation time as the 13.8V compressor, but with a limited current draw (−6.5%) and an increase of the fill performance at the same time (+20%). The amperage drop (line 230) at each voltage switch is also shown, allowing the inflator to remain under the maximum amperage. The inflation pressure is represented by the line 240.

Thus the invention provides a portable air and/or sealant dispensing device engineered for advances in vehicle systems. The dispensing devices described herein reduce user error and allow for less manufacturing expense due to fewer required functional components.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A device for dispensing air and/or sealant to a tire of a vehicle, the vehicle including a powered data communication port, the device comprising:
   a compressor; and
   a control module configured to connect to the powered data communication port to power the compressor, wherein the control module is configured to change a voltage output from the powered data communication port to the compressor during operation and/or estimate a remaining fill time for the tire,
   wherein the control module is configured to switch the voltage output at or near a predetermined amperage draw by the compressor, such that the compressor is configured to operate
      at a higher inflation rate at a first voltage, and
      at a lower inflation rate at a second voltage.

2. The device of claim 1, wherein the control module comprises a logic circuit configured to receive information about pressure originating from vehicle tire pressure sensors and/or an electronic system of the vehicle.

3. The device of claim 1, wherein the switch from the first voltage to the second voltage is preset according to a compressor motor design and efficiency.

4. The device of claim 1, wherein the control module is configured to estimate a current tire pressure and/or the remaining fill time from a power consumption of the compressor.

5. The device of claim 1, further comprising a power supply cord having a plug that fits into the data communication port.

6. The device of claim 5, wherein the control module is contained within the plug.

7. The device of claim 5, wherein the control module is configured to provide and stop power from the powered data communication port through the power supply cord to the compressor.

8. The device of claim 5, further comprising a power supply port for receiving a second end of a power supply cord.

9. The device of claim 5, wherein the powered data communication port is a powered universal serial bus (USB), and the device comprises at least one of a USB power cord or a corresponding USB.

10. The device of claim 1, wherein the control module is configured to obtain inflation values via the data communication port during the dispensing.

11. The device of claim 10, wherein the device is configured to automatically cease inflation upon automatically determining a proper inflation.

12. A device for dispensing air and/or sealant to a tire of a vehicle, the vehicle including a powered data communication port, the device comprising:
   a compressor;
   a dispenser outlet connected to the compressor;
   a power supply cord including a first end that is connected or connectable to the dispenser and a second end opposite the first end, the second end including a connector element configured to connect to the powered data communication port to obtain power; and
   the connector element including a control module configured to control a power supply to a pressure source through the power supply cord, the control module including a logic circuit configured to receive information about tire pressure originating from vehicle tire pressure sensors and/or an electronic system of the vehicle, wherein the control module is configured to adjust a voltage to the compressor according to a tire pressure and/or an amperage draw of the compressor, wherein the control module is configured to estimate a current tire pressure and/or a remaining fill time from a power consumption of the compressor.

13. The device of claim 12, wherein the control module is configured to adjust a voltage to the compressor within an efficiency range of a compressor motor as a function of a determined tire pressure.

14. The device of claim 12, wherein the control module is configured to operate the compressor at a first voltage to provide a higher inflation rate, and then switch to a second voltage during operation, wherein the second voltage provides a lower inflation rate within a predetermined compressor motor efficiency curve.

15. The device of claim 12, wherein the powered data communication port is a powered universal serial bus (USB), and the connector element comprises a first USB connector including the control module in a plug end of the USB connector.

16. A method for dispensing air and/or sealant to a tire of a vehicle via a tire repair device, wherein a compressor is connected to the tire, and a connector element is connected to a data communication port of the vehicle, the method comprising:
   a control module in the connector element operating the tire repair device dispensing via the data communication port of the vehicle;
   the control module operating the compressor at a first voltage; and
   the control module operating the compressor at a second voltage that is different from the first voltage,
      wherein operating the compressor at the first voltage provides an initial inflation rate, and
      wherein the control module is configured to lower from the first voltage to the second voltage upon reaching a predetermined maximum amperage draw for the compressor.

17. The method of claim 16, wherein the control module is configured to adjust the voltage such that compressor operates at a higher inflation rate at the first voltage, and at a lower inflation rate at the second voltage.

18. The method of claim 16, wherein the compressor operates at a higher inflation rate at the first voltage, and a lower inflation rate at the second voltage.

19. The method of claim 16, wherein the control module is configured to estimate a current tire pressure and/or a remaining fill time from a power consumption of the compressor.

20. The method of claim 16, wherein the data communication port is a powered universal serial bus (USB), and the device comprises at least one of a USB power cord or a corresponding USB.

* * * * *